Oct. 4, 1949.    M. T. GANNON    2,483,390
SELF-DEVELOPING FILM-HOLDER
Filed Jan. 10, 1948    2 Sheets-Sheet 1
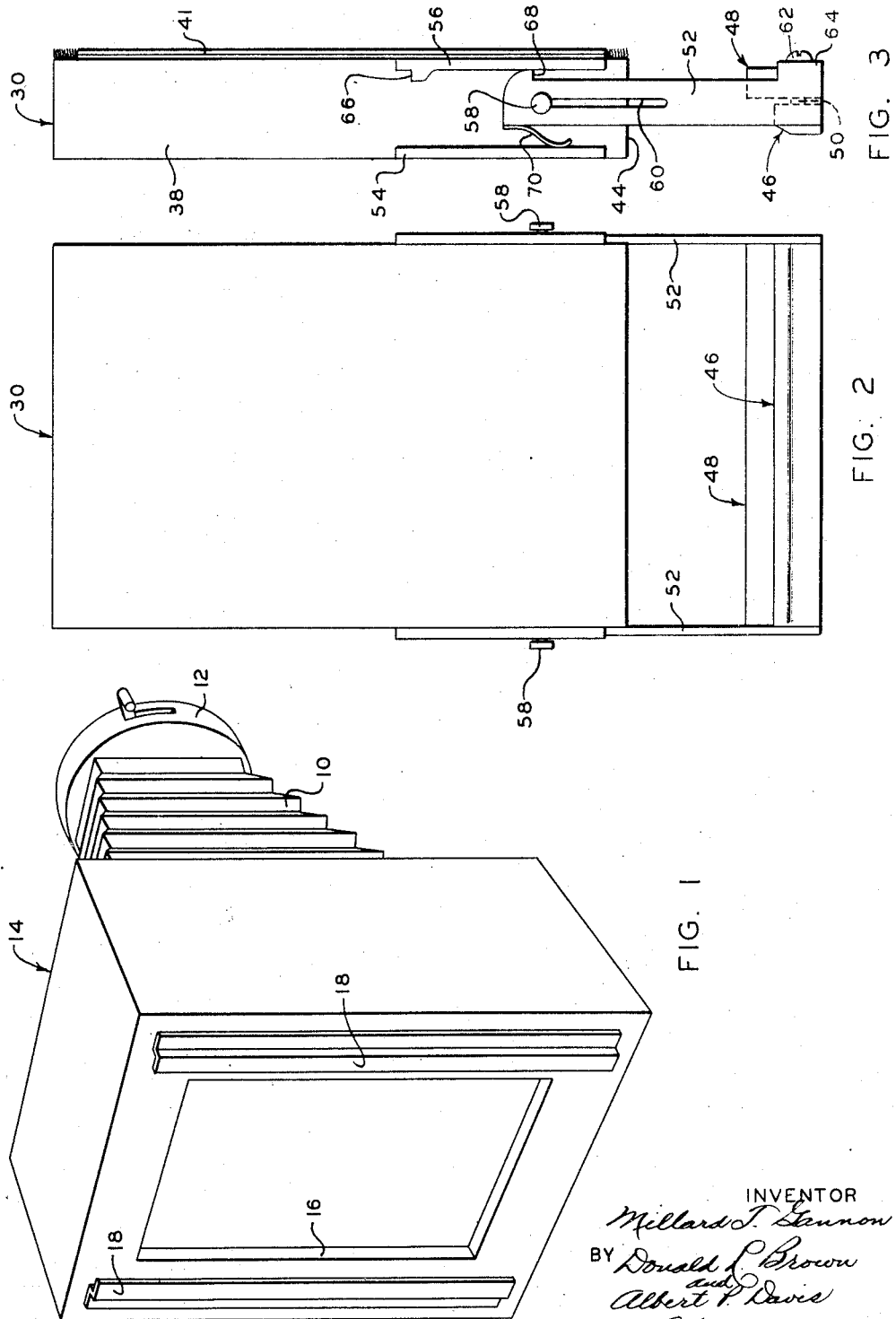

Oct. 4, 1949.  M. T. GANNON  2,483,390
SELF-DEVELOPING FILM-HOLDER
Filed Jan. 10, 1948  2 Sheets-Sheet 2
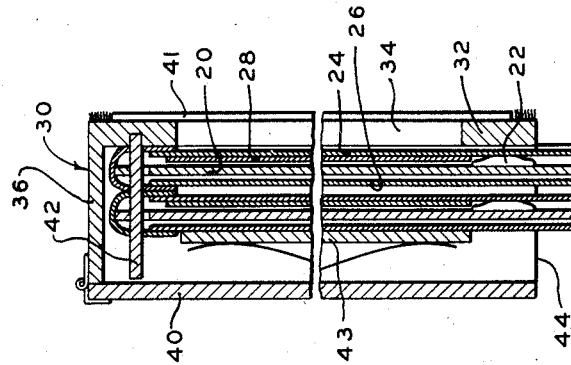
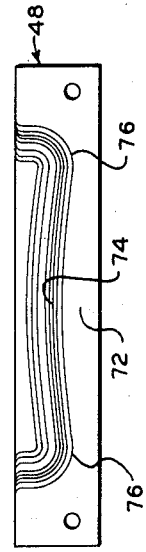
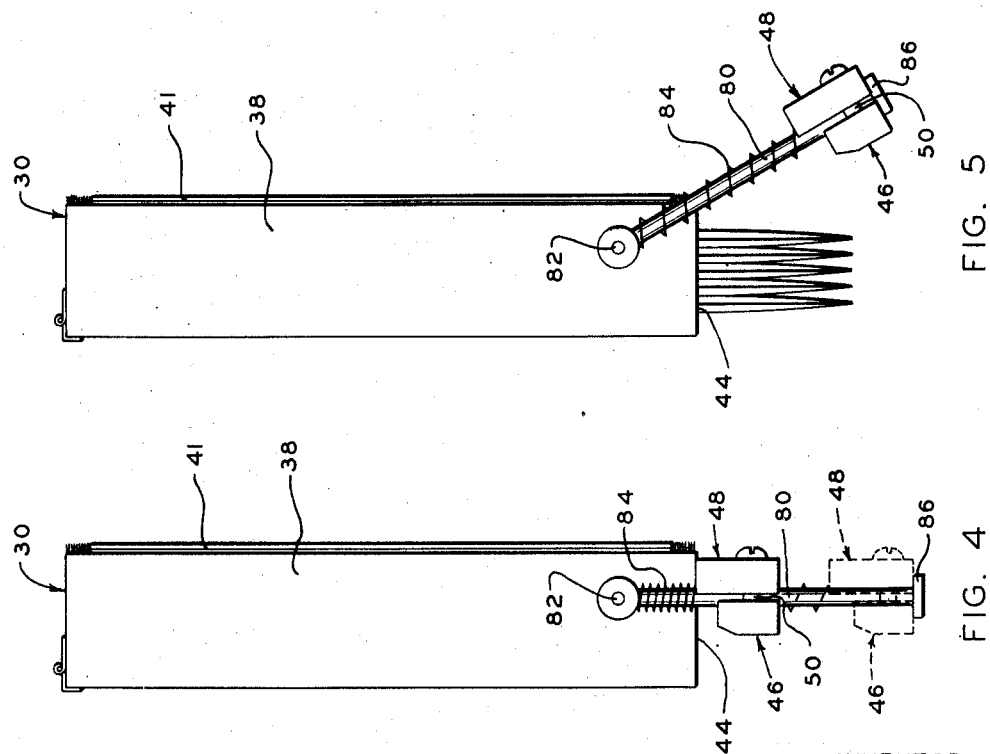
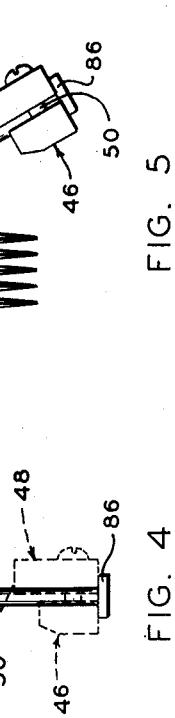
INVENTOR
Millard T. Gannon
BY Donald L. Brown
and
Albert F. Davis
Attorneys Patented Oct. 4, 1949

2,483,390

UNITED STATES PATENT OFFICE 2,483,390

SELF-DEVELOPING FILM HOLDER

Millard T. Gannon, Westwood, Mass., assignor to Polaroid Corporation, Cambridge, Mass., a corporation of Delaware Application January 10, 1948, Serial No. 1,541

2 Claims. (Cl. 95—13)

This invention relates to photographic apparatus for exposing a layer of photosensitive material to record thereon an image of an object and for processing said photographic layer wherein a liquid is spread in a layer of predetermined thickness between two sheets of flexible material one of which is said photosensitive material.

One object of the present invention is to provide a photographic apparatus for spreading a liquid photographic reagent or solvent for a photographic reagent in a layer of predetermined uniform thickness having substantially parallel marginal edges and terminating in an approximately straight edge forming an angle of substantially 90° between said marginal edges, between an exposed photosensitive surface and another surface wherein the speed with which the liquid is spread and/or the viscosity of said liquid does not affect the thickness of the layer of liquid to any appreciable degree.

Another object of the present invention is to provide a photographic apparatus for spreading a liquid photographic reagent or solvent for a photographic reagent in a layer of predetermined uniform thickness having substantially parallel marginal edges and terminating in an approximately straight edge and forming an angle of substantially 90° between said marginal edges, between a photosensitive layer comprising one surface of a sheet of deformable material and the surface of a second sheet of deformable material wherein variations in the thickness of the layers of sheet material cause only minor variations in the thickness of the layer of liquid.

A further object of the present invention is to provide a photographic apparatus comprising a slot having a fixed predetermined width and a predetermined edge configuration adapted to spread a liquid photographic reagent or solvent for a photographic reagent in a layer of predetermined uniform thickness having substantially parallel marginal edges and terminating in an approximately straight edge forming an angle of substantially 90° with said marginal edges, between a photosensitive layer comprising one surface of a sheet of deformable material and a surface of a second sheet of deformable material wherein said sheets of material are drawn through said slot to spread a layer of liquid thinner than the difference between the width of said slot and the total thickness of said sheet materials.

A further object of the present invention is to provide a photographic apparatus for carrying out the process wherein a liquid composition containing a photographic reagent or solvent for a photographic reagent is spread in a layer of predetermined uniform thickness having substantially parallel marginal edges and terminating in an approximately straight edge forming an angle of substantially 90° with said marginal edges, between a layer of photosensitive material having a latent negative image formed therein and a second layer of material adapted to receive a visible positive image of said latent image wherein the speed with which said liquid is spread and/or the viscosity of the liquid does not affect the thickness of the layer of liquid to any appreciable degree, and wherein variations in the thickness of either of the sheet materials cause only minor variations in the thickness of the layer of liquid.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a perspective view of a photographic camera adapted to utilize the apparatus of the present invention;

Fig. 2 is a view of one embodiment of the present invention;

Fig. 3 is a side view of the embodiment disclosed in Fig. 2;

Fig. 4 is a side view of another embodiment;

Fig. 5 is a view of the embodiment of Fig. 4 but showing the liquid-spreading means in an inoperative position;

Fig. 6 is a diagrammatic sectional view illustrating the embodiment of Figs. 2 and 4; and Fig. 7 is a plan view of one element of the spreading means of the embodiment of Fig. 1.

The present invention comprises a photographic device for holding and exposing one or more composite photographic film units comprising a layer of photosensitive material and at least one other layer of material and processing said film units by spreading a liquid photographic reagent, or solvent for a photographic reagent, between said photosensitive material and another layer of material in a uniform layer of predetermined thickness having substantially parallel marginal edges and terminating in an approximately straight edge forming an angle of substantially 90° with said marginal edges.

Copending application Serial No. 576,254, filed February 5, 1945, by Edwin H. Land for Photographic process, apparatus and product, now abandoned, disclosed a method of processing a photosensitive layer by spreading a thin layer of a liquid containing one or more photographic reagents, or which is a solvent for a photographic reagent, between said photosensitive layer and a second layer of material.

Copending application Serial No. 790,064, filed December 6, 1947, by Edwin H. Land, Murry N. Fairbank and David S. Grey for Photographic process and apparatus, discloses an apparatus for carrying out the process disclosed in application Serial No. 576,254, wherein the layer of liquid spread between the photosensitive layer and the second layer of material is of a predetermined uniform thickness. It is desirable in carrying out the process disclosed in application Serial No. 576,254 that the layer of liquid, in addition to being a uniform predetermined thickness, also be of substantially uniform predetermined width and this width be slightly narrower than the width of the two layers of material so that none of the liquid will escape from between said layers. It is also desirable that the layer of liquid terminate abruptly in an approximately straight line forming an angle of substantially 90° with its edges a short distance beyond the area of photosensitive material to be processed to avoid using excessive amounts of photographic reagent and also to make possible shorter photographic film units.

The present invention provides a photographic device capable of exposing a sheet of photosensitive material to actinic light and spreading a liquid between the surface of said photosensitive material and another layer of material in a layer of uniform predetermined thickness having a uniform predetermined width and terminating in an approximately straight edge forming an angle of substantially 90° with its edges. The sheet of photosensitive material may comprise any photosensitive material as, for example, silver halide. The other layer of sheetlike material preferably comprises a surface adapted to receive a visible positive image of a latent negative image contained in said photosensitive material. The liquid preferably is quite viscous, and comprises a reagent which preferably contains a substance, or a solvent for a substance, capable of differentially reacting with portions of said exposed photosensitive material to create a visible effect therein and preferably capable of being transferred to said other layer of sheetlike material to form a visible positive image. The apparatus is simple, reliable, easy to operate and results in a substantially uniform layer of liquid composition of predetermined desired thickness and width and terminates in an approximately straight edge forming an angle of substantially 90° with its edges, regardless of the speed with which said composition is spread and/or the viscosity of said liquid composition.

The photographic apparatus of the present invention is adapted to expose and process composite photographic film units of the type disclosed in copending application Serial No. 776,329, filed September 26, 1947, by Murry N. Fairbank for Photographic product, and copending application Serial No. 776,326, filed September 26, 1947, by Otto E. Wolff for Photographic product (now Patent No. 2,472,358, issued June 7, 1949), and comprises a camera having a bellows 10, lens and shutter assembly 12, a back 14 having an exposure aperture 16 formed therein, and carrying guide members 18 adapted to removably mount a film holder of the type disclosed in Figs. 2 and 4 on said back 14 in alignment with said aperture 16.

Figs. 2 and 3 illustrate a preferred embodiment of a film holder adapted to hold a plurality of composite photographic film units of the type disclosed in the above-mentioned copending applications Serial Nos. 776,329 and 776,326. The composite photographic film units are explained in detail in the above-mentioned applications Serial No. 776,329 and 776,326, but essentially they comprise (Fig. 6) a sheet of photosensitive material 20 as, for example, silver halide having a liquid-carrying container 22 mounted thereon, and this unit enclosed in an opaque envelope having front and rear walls 24 and 26, respectively. The opaque envelope may contain a second sheet of material 28 which is adapted to receive a visible positive image of any latent negative image which may be formed in said photosensitive layer 20, or a visible positive image may be formed directly on the inner surface of the envelope wall 24.

The film holder of Figs. 2 and 3 comprises a substantially rectangular container 30 having a front wall 32 having an exposure aperture 34 formed therein, a top wall 36, side walls 38 and a rear wall 40 hingedly mounted on the top wall 36. A pair of guide members 41, adapted to slidably engage guide members 18 on the back 14 to hold said container 30 on said back 14 with exposure apertures 34 and 16 in alignment, are carried by the front wall 32.

The composite photographic film units are held in the film holder by means of a pin 42 carried by front wall 32 and extending rearwardly of the container 30, and are maintained in the camera focal plane by means of a spring-pressed pressure plate 43. Container 30 is open at its lower end to provide a withdrawal opening 44 and to permit the ends of the composite photographic film units to extend from said container 30 to be readily accessible for processing.

A pair of pressure-applying liquid-spreading members 46 and 48 are mounted on the side walls 38 of container 30. The pressure-applying liquid-spreading members 46 and 48 make use of certain principles and proportions disclosed in the above-mentioned copending application Serial No. 790,064, and comprise two substantially rigid members spaced apart a predetermined distance from each other by means of a pair of spacers or washers 50 to form a fixed gap or slot having substantially the same width throughout its length. The pressure-applying members 46 and 48 are slidably and to some extent pivotally mounted on side walls 38 of container 30 by means of arms 52 for sliding movement from an inoperative position to an operative position. Arms 52 are slidably mounted on side walls 38 between guide members 54 and 56 by means of pins 58 which pass through elongated slots 60 in arms 52. The pressure-applying members 46 and 48 are fixedly held with respect to each other and also mounted on the arms 52 by means of screws 62 which pass through aligned holes in pressure-applying members 46 and 48, spacers 50 and ears or tabs 64 formed on the arms 52. A latch 66 is formed in the upper end of each of the guide members 56 and a catch 68 is formed in the upper end of each arm 52. A spring 70 attached to the upper end of each arm 52 on the side opposite from the catch 68, bears against guide member 54 and forces said catch 68 into engagement with latch 66, when the arms 52 are slid up the sides of container 30 to thus hold the liquid-spreading pressure-applying members 46 and 48 closely adjacent the open end of container 30 and in operative position. Catch 68 is released from latch 66 to permit arms 52 and pressure-applying members 46 and 48 to be moved away from the open end of container 30 to inoperative position by swinging the pressure-applying members in a counterclockwise direction, as seen in Fig. 3, to compress spring 70. After catch 68 is released from latch 66, arms 52 are free to slide along pins 58.

The surfaces of the substantially rigid members 46 and 48 which form the fixed gap or slot comprise a substantially flat or planar portion 72 and a curved, leading edge portion 74. The two leading edge portions 74 cooperate with each other to form an entrance or pressure-generating throat in the slot or gap formed by the rigid members 46 and 48. In one satisfactory form of the present invention, the leading edges 74, when viewed in cross section, curve outwardly from the flat or planar portions 72 in the arc of a circle preferably having a radius of substantially $\frac{3}{16}$ inch and the flat or planar portions 72 are spaced apart a predetermined distance which is substantially .003 inch greater than the total thickness of the two opaque envelope walls 24 and 26, the photosensitive material 20 and the second sheet of material 28. As thus far described the rigid members 46 and 48 are substantially similar to the pressure-applying members disclosed in the above-mentioned copending application Serial No. 790,064.

Inasmuch as it is desired that the edges of the layer of liquid composition fall inside the edges of both of said layers 20 and 28, the length of the leading edge portions 74 is less than the width of either of said layers 20 and 28. The leading edge portions 74 do not terminate abruptly but merge at each end into a concave curve 76 having a radius of substantially ⅛ inch. This results in the flat or planar portions 72 which are parallel to each other when the rigid members 46 and 48 are in assembled relation having a greater width at each of their ends than they have at their central portions. The concave curves 76 into which the leading edge portions 74 merge and the wide end portions of the members 46 and 48 act as dams at each end of the pressure-generating throat and prevent the hydraulic pressure generated in the liquid composition from spreading said liquid composition longitudinally along said members 46 and 48 beyond said concave curves 76. The leading edge portions 74 do not extend in a straight line between the concave curves 76 but instead arch upwardly substantially ⅛ inch in a smooth curve which extends substantially from one concave curve 76 to the other concave curve 76. The upward arch in the leading edge portions 74 causes the liquid being spread between the layer of photosensitive material 20 and the second layer of material 28 to be evenly distributed along said leading edges 74 so that substantially all of said liquid will be exhausted at the same time, resulting in a liquid layer having an approximately straight end forming an angle of substantially 90° with the marginal edges of the liquid layer.

When a layer of photosensitive material and a second sheet of material having a supply of liquid composition located between their interface surfaces are advanced through the slot or gap formed by the pressure-applying liquid-spreading members 46 and 48, the pressure-generating throat formed by the leading edge portions 74 causes a hydraulic pressure to be generated in said supply of liquid composition and said hydraulic pressure causes a predetermined quantity of said liquid composition to be forced through said slot or gap with each unit area of said two sheets of material, as more particularly set forth in the above-mentioned application Serial No. 790,064. The concave curves 76 into which the leading edge portions 74 merge and the said flat or planar portions 72 at the end of each of the members 46 and 48 act as dams at each end of the pressure-generating throat and prevent the hydraulic pressure generated in the liquid composition from spreading said liquid composition longitudinally along the members 46 and 48 beyond the concave curves 76; thus, by preventing the liquid composition from spreading longitudinally past the concave curves 76, the layer of liquid composition spread between the photosensitive material 20 and the second layer of material 28 is of uniform predetermined width and that width is less than the width of said two layers of material. At the same time, the upwardly arched configuration of leading edge portions 74 tends to cause the liquid composition to spread longitudinally of the members 46 and 48. This tendency to spread the liquid composition laterally prevents it from forming a pool in the center of said members 46 and 48 and as a result the liquid composition arranges itself substantially uniformly along the distance between the concave curves 76 with the result that the supply of liquid composition is exhausted at approximately the same time along the entire length of the leading edge portions 74, thus giving a liquid layer that terminates in an approximately straight line.

In addition to the above-described configuration of pressure-applying members 46 and 48, these members are shaped and mounted on container 30 in such a manner that moving them from their inoperative position to their operative position adjacent the open end 44 of container 30 causes the end of the composite photographic film unit located adjacent the exposure aperture 34 to pass through the slot or gap formed by members 46 and 48. To permit this, pressure-applying member 46 is a predetermined distance shorter than member 48 and the length of the arms 52 is such that when the two pressure-applying liquid-spreading members 46 and 48 are in inoperative position, member 46 can pass beneath the ends of the composite photographic film units and the upper portion of member 48 will engage their ends. The upper edge 78 of member 46, at least throughout that portion of its width which is adapted to pass beneath the composite photographic film units, is wedge-shaped in cross section so that as the two pressure-applying members 46 and 48 are moved towards the container 30 said wedge-shaped edge 78 can readily enter between the film unit adjacent exposure aperture 34 and the next composite photographic film unit in the container 30 to start said adjacent film unit through the slot or gap. It is possible to cause the wedge-shaped edge 78 to automatically enter between the composite photographic film unit adjacent exposure aperture 34 and the next succeeding photographic film unit by so proportioning pressure-applying members 46 and 48 that the distance between the inner surface of the upper edge of member 48 and the wedge-shaped edge 70 of member 46 is substantially equal to the thickness of one composite photographic film unit, or if it is desired to have a greater distance between these two elements, one or more stops may be placed on the inner surface of the upper edge of member 48 which will cause the wedge-shaped edge 78 to register with the space between the composite photographic film units.

To expose and process one of the above-described composite photographic film units in the photographic apparatus of the present invention and more particularly the embodiment disclosed in Figs. 2 and 3, a film holder having one or more of said composite photographic film units loaded in the container 30 is fitted onto the back of the camera apparatus. Catches 68 are released from latches 66 and the pressure-applying liquid-spreading members 46 and 48 are moved away from the container 30 into their inoperative position. The pressure-applying liquid-spreading members 46 and 48 are next moved back into their operative position to thread the lower end of a composite photographic film unit through the slot or gap formed by the members 46 and 48 and to cause catches 68 to engage latches 66. The end of the opaque envelope which extends through the slot or gap and past the end of the photo-sensitive material 20 is then grasped and the opaque envelope is pulled out of the container 30 until the photosensitive material located in back of the exposure aperture 34 is uncovered. The photosensitive layer is then exposed to actinic light by operating the lens and shutter assembly 12 and the opaque envelope is pushed back into the container 30 to again cover the photosensitive material 20 and to place the second sheet of material 28 in registration with the exposed area on the photosensitive material. The entire photographic film unit is then drawn out of the container 30 through the slot or gap formed by liquid-spreading pressure-applying members 46 and 48 by grasping the composite photographic film unit high enough so that the lower end of the sheet of photosensitive material 20 is also grasped. The pressure-generating throat formed by the leading edges 74 causes a hydraulic pressure to be generated in the liquid composition carried by the liquid-carrying container 22. This hydraulic pressure causes the liquid-carrying container 22 to rupture and release said contained liquid whereupon the pressure-generating throat upon continued movement of the composite photographic film unit through said slot or gap causes said liquid to be spread in a uniform layer of predetermined thickness between said photosensitive material 20 and the second sheet of material 28.

The modification disclosed in Figs. 4 and 5 differs from the modification of Figs. 2 and 3 in the manner in which the pressure-applying liquid-spreading members 46 and 48 are mounted on container 30 and the manner in which the means for mounting members 46 and 48 operate. Liquid-spreading members 46 and 48 are pivotally and slidably mounted with respect to container 30 by means of arms 80 pivotally mounted on the side walls 38 of container 30 by means of pins 82. Liquid-spreading members 46 and 48 are slidably mounted on arms 80 by means of grooves or recesses formed in the end portions of said members 46 and 48 which, when said members 46 and 48 are in assembled relation, as illustrated in Figs. 4 and 5, slidably receive said arms 80. A pair of springs 84 are interposed on said arms 80 between the members 46 and 48 and pins 82. A head or stop 86 is formed on the lower end of each of the arms 80 to prevent liquid-spreading members 46 and 48 from coming off of said arms 80. It will thus be seen that in this modification pressure-applying liquid-spreading members 46 and 48 are capable of sliding toward and away from the open end 44 of container 30 on the arms 80 and also are capable of being pivoted away from said open end 44 around the pins 82.

When it is desired to expose and process one of the above-described composite photographic film units in the modification of Figs. 4 and 5, the pressure-applying liquid-spreading members 46 and 48 are slid vertically upward on the arms 80 to cause the lower end of said composite photographic film unit to extend through the slot or gap formed by said members 46 and 48. The lower end of the opaque envelope is then grasped and the opaque envelope is pulled out of the container 30 until the photosensitive material located in back of the exposure aperture 34 is uncovered. As the opaque envelope is drawn from the container 30 the pressure-applying liquid-spreading members 46 and 48 move back down the arms 80 under the influence of springs 84. After the photosensitive material has been exposed the opaque envelope is pushed back into the container 30 to again cover the photosensitive material 20. The act of pushing the opaque envelope back into the container 30 causes the fingers of the operator to engage the lower edges of the pressure-applying liquid-spreading members 46 and 48 and again slide them upwardly on the arms 80. The entire photographic film unit is then drawn out of the container 30 by grasping the composite photographic film unit high enough so that the lower end of the sheet of photosensitive material is also grasped. As the composite photographic film unit is drawn out of the container 30 the pressure-applying liquid-spreading members 46 and 48 are again permitted to slide down the arms 80 under the influence of springs 84 until they strike the stops 86. Continued withdrawal of the composite photographic film unit after the pressure-applying liquid-spreading members 46 and 48 strike the stops 86 causes the above-mentioned hydraulic pressure to be generated in the liquid composition to rupture container 22 and spread the liquid between the photosensitive layer 20 and the second layer of material 28 as above described.

Whereas the pressure-applying liquid-spreading members 46 and 48 have been disclosed as fixedly mounted with respect to each other, it will be understood that they can be adjustably mounted with respect to each other by means of an adjustment screw or screws or that they can be held a predetermined minimum distance apart by means of spring-loading of sufficient strength to resist the hydraulic pressures generated in the liquid composition but which will permit incompressible objects to pass between the members 46 and 48. It will also be understood that the pressure-applying liquid-spreading members 46 and 48 can be employed in other types of photographic apparatus, as for example, they can be employed to spread a liquid between a photosensitive material and another layer of material which are carried by the photographic apparatus in roll form.

Since certain changes in the constructions set forth which embody the invention may be made without departing from its scope, it is intended that all matter contained in the above description or shown in the accompanying drawings shall be interpreted as illustrative and not in a limiting sense.

What is claimed is:

1. In a photographic apparatus comprising means for releasably positioning a layer of photosensitive material and another layer of material in said apparatus, said means being so constructed that a predetermined image area on said photosensitive layer can be exposed to actinic light and said photosensitive layer and said other layer can be drawn therefrom in face-to-face relation, the combination with said means of two substantially parallel rigid members spaced from each other a predetermined distance, said parallel members being so positioned with respect to said means that said photosensitive layer and said other layer of material can be drawn therebetween in face-to-face relation, a portion of the space between said parallel members comprising a pressure-generating throat whereby a hydraulic pressure can be generated in a liquid located between said layers of material to cause said liquid to form a layer of substantially uniform thickness between said layers of material, each said member having a curved surface which forms part of said pressure-generating throat, each said curved surface being bounded on the bottom edge thereof by a relatively flat surface, said curved surface so merging with the bottom flat surface that the line of merger is a curved line which is arched upwardly in a direction opposite to the direction in which said layers of material pass between said members.

2. In a photographic apparatus comprising means for releasably positioning a layer of photosensitive material and another layer of material in said apparatus, said means being so constructed that a predetermined image area on said photosensitive layer can be exposed to actinic light and said photosensitive layer and said other layer can be drawn therefrom in face-to-face relation, the combination with said means of two substantially parallel rigid members spaced from each other a predetermined distance, said parallel members being so positioned with respect to said means that said photosensitive layer and said other layer of material can be drawn therebetween in face-to-face relation, a portion of the space between said parallel members comprising a pressure-generating throat whereby a hydraulic pressure can be generated in a liquid located between said layers of material to cause said liquid to form a layer of substantially uniform thickness between said layers of material, each said member having a curved surface which forms part of said pressure-generating throat, each said curved surface being bounded on two sides and the bottom edge thereof by relatively flat surfaces, said curved surface so merging with the bottom flat surface that the line of merger is a curved line which is arched upwardly in a direction opposite to the direction in which said layers of material pass between said members, said flat portions on both sides of said curved portion providing nonpressure-generating portions of said throat.

MILLARD T. GANNON.

REFERENCES CITED

The following references are of record in the file of this patent:

UNITED STATES PATENTS

| Number | Name | Date |
| --- | --- | --- |
| 1,277,462 | Newman | Sept. 3, 1918 |